United States Patent
Fowler et al.

(10) Patent No.: US 6,339,428 B1
(45) Date of Patent: Jan. 15, 2002

(54) METHOD AND APPARATUS FOR COMPRESSED TEXTURE CACHING IN A VIDEO GRAPHICS SYSTEM

(75) Inventors: Mark C. Fowler, Hopkinton; Paul Vella, Boston; Michael T. Wright, Marlborough, all of MA (US)

(73) Assignee: ATI International Srl, Barbados (KN)

( * ) Notice: Subject to any disclaimer, the term of this patent is extended or adjusted under 35 U.S.C. 154(b) by 0 days.

(21) Appl. No.: 09/356,398

(22) Filed: Jul. 16, 1999

(51) Int. Cl.[7] .................................................. G06T 17/00
(52) U.S. Cl. ...................................... 345/582; 345/583
(58) Field of Search ................................. 345/418, 419, 345/423, 424, 428, 581, 582, 583

(56) References Cited

U.S. PATENT DOCUMENTS

| | | | |
|---|---|---|---|
| 6,204,856 B1 | * 3/2001 | Wood et al. ................. | 345/429 |
| 6,222,555 B1 | * 4/2001 | Christofferson et al. .... | 345/430 |
| 6,232,981 B1 | * 5/2001 | Gossett ........................ | 345/430 |
| 6,256,038 B1 | * 7/2001 | Krishnamurthy ............ | 345/419 |
| 6,268,861 B1 | * 7/2001 | Sanz-Pastor et al. ........ | 345/426 |
| 6,292,194 B1 | * 9/2001 | Powell, III .................. | 345/430 |
| 6,295,070 B1 | * 9/2001 | Wood .......................... | 345/430 |

* cited by examiner

*Primary Examiner*—Cliff N. Vo
(74) *Attorney, Agent, or Firm*—Vedder, Price, Kaufman & Kammholz

(57) ABSTRACT

A method and apparatus for reducing memory bandwidth usage in video graphics texturing operations that utilizes caching of compressed textures is presented. Texture information for texturing operations is stored in a memory structure in a compressed format. When texture information is needed for a texturing operation, a local cache is first examined to determine if the texture information required for the texturing operation is present within the cache. If it is not, the texture information is retrieved from the memory in a compressed format and stored in the cache in the compressed format. The compressed texture information is then retrieved from the cache each time it is required for a texturing operation and decompressed prior to use in such texturing operations.

30 Claims, 3 Drawing Sheets

METHOD AND APPARATUS FOR COMPRESSED TEXTURE CACHING IN A VIDEO GRAPHICS SYSTEM

FIELD OF THE INVENTION

The invention relates generally to video graphics processing and more particularly to a method and apparatus for compressed texture caching in a video graphics system.

BACKGROUND OF THE INVENTION

Computers are used in many applications. As computing systems continue to evolve, the graphical display requirements of the systems become more demanding. This is especially true in applications where detailed three-dimensional graphical displays must be updated quickly. One example of such an application is a computer game where movement and modification of background images may place great demands on the processing power of the computing system.

In order to display some screen images, detailed textures are stored in memory. These textures are digitized images drawn onto three-dimensional shapes to add visual detail. One example is a brick pattern that would be mapped onto a wall structure, and if the walls extending into the distance, the texture will be mapped in such a way as to show perspective.

The use of detailed textures can consume a large amount of available memory bandwidth in a video graphics systems as the textures may need to repeatedly be read from memory for use in texturing operations. As texture mapping operations consume more and more of the available memory bandwidth in video graphics processing circuits, overall performance of these video graphics circuits may be compromised. This is due to the fact that other circuit blocks also require access to the memory that stores the textures. If the texturing operations monopolize use of the memory, these other circuit blocks may be unable to properly perform their functions in a timely manner and, as a result, may degrade the performance of the video graphics system as a whole.

One prior art solution that reduces memory bandwidth associated with reading texture data stores portions of the textures in a cache included in the video graphics circuit. Recently used texture data that is still in the cache does not have to be retrieved from memory each time it is reused. However, in order to be effective, the cache must be of a relatively large size. Large caches consume a large amount of die area in integrated circuit solutions, and therefore add to the cost of video graphics systems that utilize such large caches.

Another prior art solution utilizes compression techniques to compress the texture data in the memory structure. When texture data is required from memory, it is decompressed prior to use. However, in these systems data that is reused repeatedly must be fetched and decompressed from memory each time it is used. Although memory bandwidth is reduced by the reduction in the amount of data that must be repeatedly retrieved from memory, the bandwidth required to retrieve the compressed data and decompress it is still substantial.

Another hybrid prior art solution employs both compression and caching in a technique that stores compressed texture data in memory and decompresses the texture data as it is retrieved for use in texturing operations. After the texture data is decompressed, it is stored in an on-chip cache such that repeated use of the same texture data would be possible without additional memory bandwidth of the external texture memory being utilized. However, this solution still suffers from the additional cost associated with a large cache structure.

Therefore, a need exists for a method and apparatus that reduces memory bandwidth usage for texturing operations while limiting the size of any cache structures used to store texture data.

DETAILED DESCRIPTION OF A PREFERRED EMBODIMENT OF THE INVENTION

Figure 1:
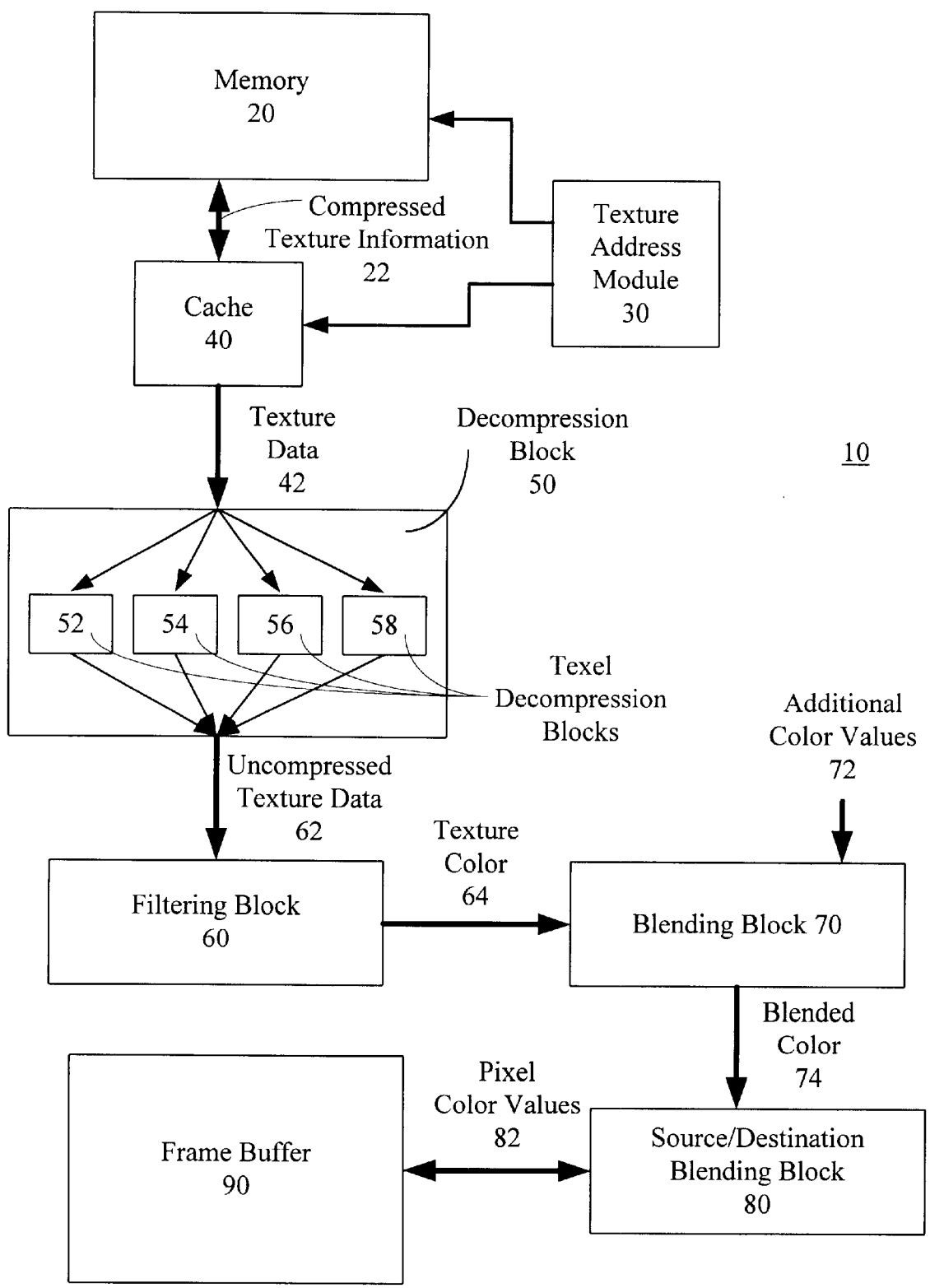
FIG. 1 illustrates a block diagram of a video graphics texture mapping circuit in accordance with the present invention.

Generally, the present invention provides a method and apparatus for reducing memory bandwidth usage in video graphics texturing operations. This is accomplished by storing texturing information in a memory structure in a compressed format. When texture information is needed for a texturing operation, a local cache is first examined to determine if the texture information required for the texturing operation is present within the cache. If it is not, the texture information is retrieved from the memory in a compressed format and stored in the cache in the compressed format. The compressed texture information is then retrieved from the cache each time it is required for a texturing operation and decompressed prior to use in such texturing operations.

Because the texture information is stored in the cache in a compressed format, more texture information can be stored in a cache of limited size, thus reducing the size requirements for the cache in a video graphics system. This is accomplished while ensuring that memory bandwidth is minimized by storing the texturing information in the memory structure as compressed texture information. The compressed texture information requires less memory bandwidth to retrieve because less data must be retrieved from the memory for each texturing operation. Because the texture information is preferably compressed in a manner such that each individual texel can be decompressed independently, multiple decompression operations for a single texturing operation can be performed in parallel. This ensures that the performance of the system is not compromised by decompression operations performed on the texture information prior to use.

Texture maps stored in video graphics system for texturing operations are typically referenced in UV space. As texturing operations apply textures to video graphics primitives, which are preferably triangle primitives that are commonly used in video graphics systems, the appropriate position within the texture map that corresponds to a particular pixel within the graphics primitive must be determined. This determination is based on a mapping between the pixel position in XY space, which is the reference space within which the primitive is rendered, to UV space, which is the reference frame for texture maps. When a texture is to be applied to a received graphics primitive, the graphics primitive will include texture coordinate data corresponding to the applicable texture. Preferably, the texture coordinate data are the UV coordinates corresponding to the pixels at the vertices of the video graphics primitive. For example, a triangle primitive will include the UV coordinate values corresponding to the pixels at its vertices.

Based on the known UV mappings at the vertex locations of the video graphics primitive, the appropriate UV coordinates for any pixel within the graphics primitive can be determined using interpolation. This then allows each pixel within the video graphics primitive to be mapped into the texture space at the appropriate UV coordinates.

The point in the texture space defined by the UV coordinates determined by the interpolation is then typically used to perform a weighted average of the color of the texels, or individual texture components, surrounding the particular point in UV space. The weighted average of the surrounding texel colors is then used to determine the color for the particular pixel in the video graphics primitive. Various numbers of texels may be included in the determination of the color for the particular pixel, and the weighted average performed using these texels may be system dependent. In one embodiment, bilinear filtering is used to determine the pixel color value by determining the weighted average of the closest four texels to the point in UV space. However, other forms of filtering may use a much large number of texels. It should be apparent to one of ordinary skill in the art that various methods may be used to determine the color for a pixel based on stored texture information that is mapped to the primitive that includes the pixel.

FIG. 1 illustrates a block diagram of a video graphics texture mapping circuit 10 that may be used to contribute to the determination of the final color value for various pixels in a display frame. The video graphics texture mapping circuit 10 includes a memory 20, a cache 40, a texture address module 30, and a decompression block 50. The available bandwidth for accessing the memory 20 is often a performance-limiting factor in video graphic circuits. As such, one of the objectives of the present invention is to help to minimize the memory bandwidth required to perform texturing operations within the video graphics system. In order to facilitate this, the texture information stored in the memory 20 is stored in a compressed format. The memory 20 may be local system memory, or memory accessible over an accelerated graphics for (AGP) bus. The compression algorithm utilized for compressing the texture information prior to storage in the memory 20 is preferably one that compresses each of the texels within a texture independently of other texels in the texture.

One such compression technique that can be utilized to individually compress texels within the texture is the DIRECTX compressed texture format that has been developed by MICROSOFT. The DIRECTX compressed texture format divides texture maps into 4-by-4 texel blocks. For each texel block, two 16-bit color values are used as reference colors for the texel block. Each of the texels within the 4-by-4 block is then represented by a two-bit encoding, where the two-bit encoding either selects one of the two 16 bit colors, a combination of the two colors, or, in some embodiments, a transparent color for the texel.

For example, if the first reference color value is a blue color, and the second reference color value is a red color, the four potential colors may be the red color (encoded with the value "00"), the blue color (encoded with the value "11"), and two different shades of purple. The first shade of purple may have a one-third contribution of the red color and a two-thirds contribution of the blue color and be encoded with the value "01". The other purple may be a two-thirds contribution of the red color and a one-third contribution of the blue color and be encoded with the value "10". In another embodiment, the available encoding values may be used to encode the red color, the blue color, a purple color that is a half red and half blue, while the fourth encoding value may be used to encode a transparent texel.

Although each two-bit encoding is dependent on the two reference color values (with the exception of a transparent or other constant encoding), the two-bit encodings are not dependent on other two-bit encodings within the texel block. As such, each texel can be compressed or decompressed independent of other texels within the block. Such texel independence allows for decompression of multiple texels simultaneously, which is beneficial when multiple texel values are combined to determine the final pixel color.

In order to minimize the memory bandwidth required to fetch the compressed texture information 22 from the memory 20 for usage, the cache 40 is included in the video graphics texture mapping circuit 10. The texture information stored in the cache 40 remains in the compressed format, thus enabling the cache 40 to effectively store more texture information than it could if the texture information was decompressed prior to storage in the cache 40. The system illustrated in FIG. 1 takes advantage of the capability of being able to decompress texture information on demand such that when particular texels are required for a texturing operation they can be fetched from the cache and decompress prior to use. This reduces the required cache size needed to maintain high performance levels in texturing operations.

Because the cache 40 is of limited size, it preferably only stores a portion of the compressed texture information that is present in the memory 20. As such, a texture address module 30 is used to determine whether or not the texture data for a particular texturing operation is currently stored in the cache 40. When the texture data is not stored in the cache 40, the texture address module 30 copies the compressed texture information 22 from the memory 20 into the cache 40. Once the required texture data for the texturing operation is present in the cache 40, the texture address module 30 provides control information, which can include address and control signals, to the cache 40 such that the cache 40 provides the required texture data 42 at its outputs.

The decompression block 50 receives the texture data 42 from the cache 40 and decompresses the texture data 42 to produce uncompressed texture data 62. The uncompressed texture data 62 can then be used in the texturing operation. In many cases, the uncompressed texture data 62 includes a plurality of texels, and the filtering block 60 filters the uncompressed texture data 62 to produce a resultant texture color 64. For example, if bilinear filtering is utilized in the texture mapping circuit, the uncompressed texture data 62 may include four different texel color values, where the filtering block 60 filters these texel color values to produce the resultant texture color 64. It should be apparent to one of ordinary skill in the art that various filtering operations may be performed by the filtering block 60 and that the number of texture colors included in the uncompressed texture data 62 can vary.

Preferably, the decompression block 50 includes a plurality of texel decompression blocks 52–58 such that a number of different decompression operations can be performed in parallel. Assuming that the texture has been compressed in a manner such that compression and decompression of the various texel color values is independent of other texel color values, the texel decompression blocks 52–58 can decompress a plurality of texel colors in parallel. Therefore, if the filtering operation performed by the filter block 60 requires four texel colors, the decompression block 50 may includes four texel decompression blocks such that the four texel colors are decompressed simultaneously and provided to the filtering block 60 in parallel. In other embodiments, the texel decompression blocks may be fast enough that they can perform two texel color decompressions within the time period required to perform a filtering operation. In such an embodiment, if four texel colors are required for a filtering operation, two texel decompression blocks may suffice as each can perform two decompression operations within the limited time allotted by each filtering operation.

Once the texture color value 64 has been generated by the filtering block 60, it may be blended with additional color values 72 in the blending block 70. The additional color values 72 may include interpolated color values or constant color values that are blended with the texture color to produce the blended color 74. In other embodiments, the additional color values 72 may include other texture colors corresponding to other textures which also map to the particular pixel for which the color value is being determined. Such an example is described in more detail with respect to FIG. 2.

Preferably, the blended color 74 is provided to a source/destination blending block 80 that is operably coupled to the frame buffer 90. The frame buffer 90 stores pixel colors for a plurality of pixels, and preferably stores a pixel color for each pixel of the display frame. The source/destination blending block 80 blends the blended color 74 with a stored color 82 for a corresponding pixel that is stored in a corresponding pixel location in the frame buffer. The blending performed by the source/destination blending block 80 produces a resultant pixel color that is then stored in the corresponding pixel location of the frame buffer. In other words, if the blended color 74 is to be applied to a particular pixel, the source/destination blending block 80 will retrieve the current pixel color value 82 for that particular pixel from the frame buffer 90 and perform a blending operation between the blended color 74 and the fetched pixel color value 82. The resultant color value is then stored back into the frame buffer 90 at the appropriate location, overwriting the previously stored value.

It should be noted that the functions performed by the blending block 70 and the source/destination blending block 80 may be combined within a single blending unit. In addition, the majority of the components illustrated in FIG. 1 are preferably included on a single integrated circuit that performs three-dimensional video graphics processing as well as two-dimensional processing such as two-dimensional scaling operations. In many cases the memory 20 and the frame buffer 90 may be located external to this integrated circuit due to the large amount of die area required to implement such memory structures. However, it should be apparent to one of ordinary skill in the art that, as processing technology continues to evolve, the inclusion of such memory structures in the integrated circuit may become more economically feasible.

Figure 2:
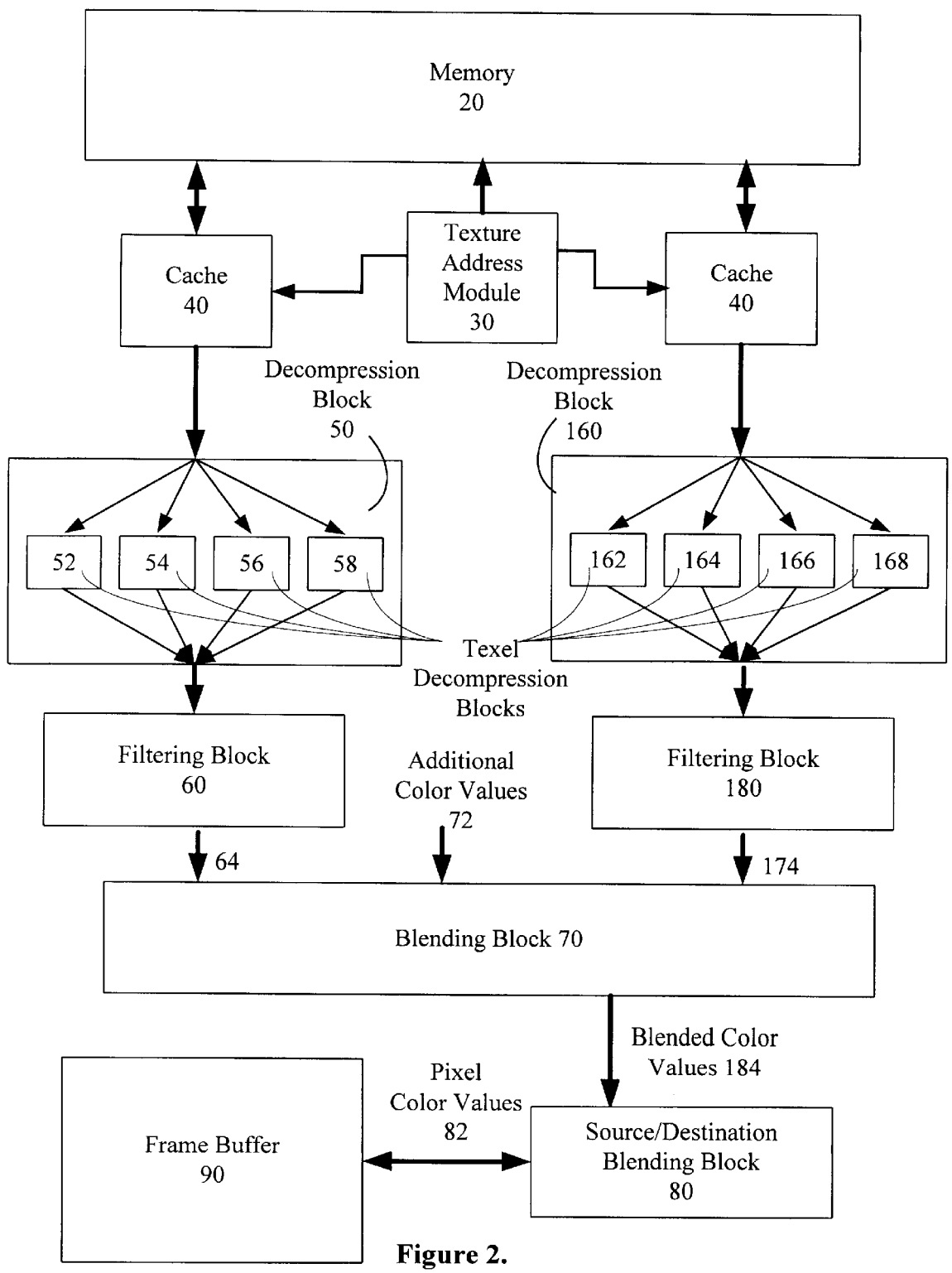
FIG. 2 illustrates a block diagram of an alternate video graphics texture mapping circuit in accordance with the present invention.

FIG. 2 illustrates an alternate embodiment of the invention in which a plurality of caches and a plurality of decompression blocks are employed to enable multiple textures to be decompressed and utilized simultaneously in the system. The video graphics texture mapping circuit 100 of FIG. 2 includes the memory 20, the texture address module 30, a plurality of caches 40 and 120, and a plurality of decompression blocks 50 and 160. Although only two caches are illustrated in the drawing, additional caches may be included to facilitate handling of even more texture information in the system. The video graphics texture mapping circuit 100 may be employed to allow for multiple textures to be mapped to a single pixel such that the eventual color determined for the pixel is based on more than one texture. Note that the multiple caches included in this system may be unnecessary if a single cache that has enough read and write ports and sufficient storage to contain multiple textures is used.

As was the case with FIG. 1, the memory 20 stores compressed texture information that corresponds to at least one texture, and more preferably to a number of textures. As stated earlier, the memory 20 may be local system memory or may be memory accessible over an accelerated graphics for (AGP) bus. The plurality of caches 40 and 120 are operably coupled to the memory 20 and store a portion of the compressed texture information that is included in the memory 20. Preferably, each of the caches 40 and 120 stores different texture data, but if one texture is used for multiple operations simultaneously, the texture may be stored in more than one of the plurality of caches.

The texture address module determines whether or not the texture data corresponding to the present texturing operation is stored in one or more of the plurality of caches 40 and 120 such that it is available for use in the texturing operation. Note that a number of different texturing operations may be occurring simultaneously in this system, and, in such cases, the texture address module 30 must determine whether all of the appropriate texturing information is included in the plurality of caches 40 and 120. Note that the texture address module 30 must also ensure that the texture data is stored in the caches 40 and 120 in a manner that allows it to be properly used in the current texturing operation or operations. In other words, if a particular pixel color is to be determined based on two different textures and both textures are stored in the cache 40, it may not be possible to combine the information from both textures in a single operation. In such an instance, the texture address module may be required to ensure that one of the two textures is stored in the cache 40 and the other is stored in the cache 120.

When the texture address module determines that the texture data needed for the texturing operation or operations is not present or properly accessible in the plurality of caches 40 and 120, the texture address module 30 copies the texture data in compressed format from the memory 20 to one or more of the plurality of caches 40 and 120. The texture address module 30 then provides control information to the plurality of caches 40 and 120 such that the texture data for the texturing operation is provided at the outputs of one or more of the plurality of caches 40 and 120.

A plurality of decompression blocks 50 and 160 are coupled to the plurality of caches 40 and 120. The plurality of decompression blocks 50 and 160 decompress the texture data provided at the outputs of the plurality of caches 40 and 120 to produce uncompressed texture data for the texturing operation. As is the case with the decompression block 50 the decompression block 160 may include a plurality of texel decompression blocks 162–168 that permit multiple texels to be decompressed individually and in parallel. Note that although each decompression block 50 and 160 is shown to include four texel decompression blocks, the number of texel decompression blocks can vary based on many factors. The uncompressed texture data resulting from the decompression operations can then be used in the texturing operation within the circuit 100. It should be obvious to one of ordinary skill in the art that if the decompression blocks are able to operate at a higher rate of speed than the other texture mapping blocks, fewer decompression blocks may be required as they can perform multiple texel decompressions during the available time between texturing operations.

Preferably, filtering blocks 60 and 180 are included in the system to filter the uncompressed texture data provided by the decompression block 50 and 160. For example, if the filtering to be performed is a bilinear filtering operation, each of the filtering blocks 60 and 180 will receive four texel colors and filter these colors to produce a resultant texture color 64 and 174, respectively.

The blending block 180 combines each of the texture colors 64 and 174 with additional color values to produce a blended color 184. In the system illustrated in FIG. 2, if one texture is decompressed and filtered using the decompression block 50 and the filtering block 60, and another texture is decompressed and filtered using decompression block 160 and filtering block 180, the resultant texture colors 64 and 174 may be blended in the blending block 180 to produce a blended color value 184 that is a combination of the two textures. In other embodiments, additional color values 182 may be provided that are based on constant color values or other interpolated color values for blending with the texture colors 64 and 174. Thus, the blended color values 184 may be a single color value resulting from the blending of color values from multiple textures, or may be a number of color values resulting from the plurality of textures. Depending on the number of caches, decompression blocks, and filtering blocks included in this system, the number of combinations or blending operations that may be performed by the blending block 180 can vary significantly.

As was the case with the circuit illustrated in FIG. 1, the source/destination blending block 80 receives the blended color values 184 and combines them with pixel color values 82 that are fetched from the frame buffer 90. The resultant color values of the combination operations performed by the source/destination blending block 80 are then stored back into the frame buffer 90. The colors stored in the frame buffer 90 can then be fetched by display circuitry for rendering of the frame to a display.

Preferably, the majority of the components illustrated in FIG. 2, aside from the memory structures, are included in a single integrated circuit that performs three-12-dimensional video graphics processing. Such an integrated circuit is also preferably capable of performing two-dimensional video graphics processing operations such as two-dimensional scaling operations.

Figure 3:
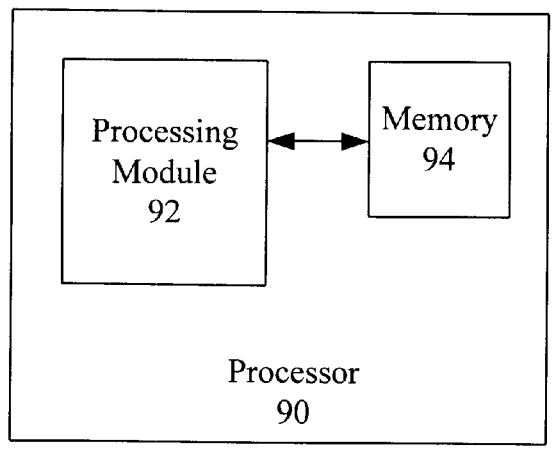
FIG. 3 illustrates a block diagram of a texturing processor in accordance with the present invention.
Figure 4:
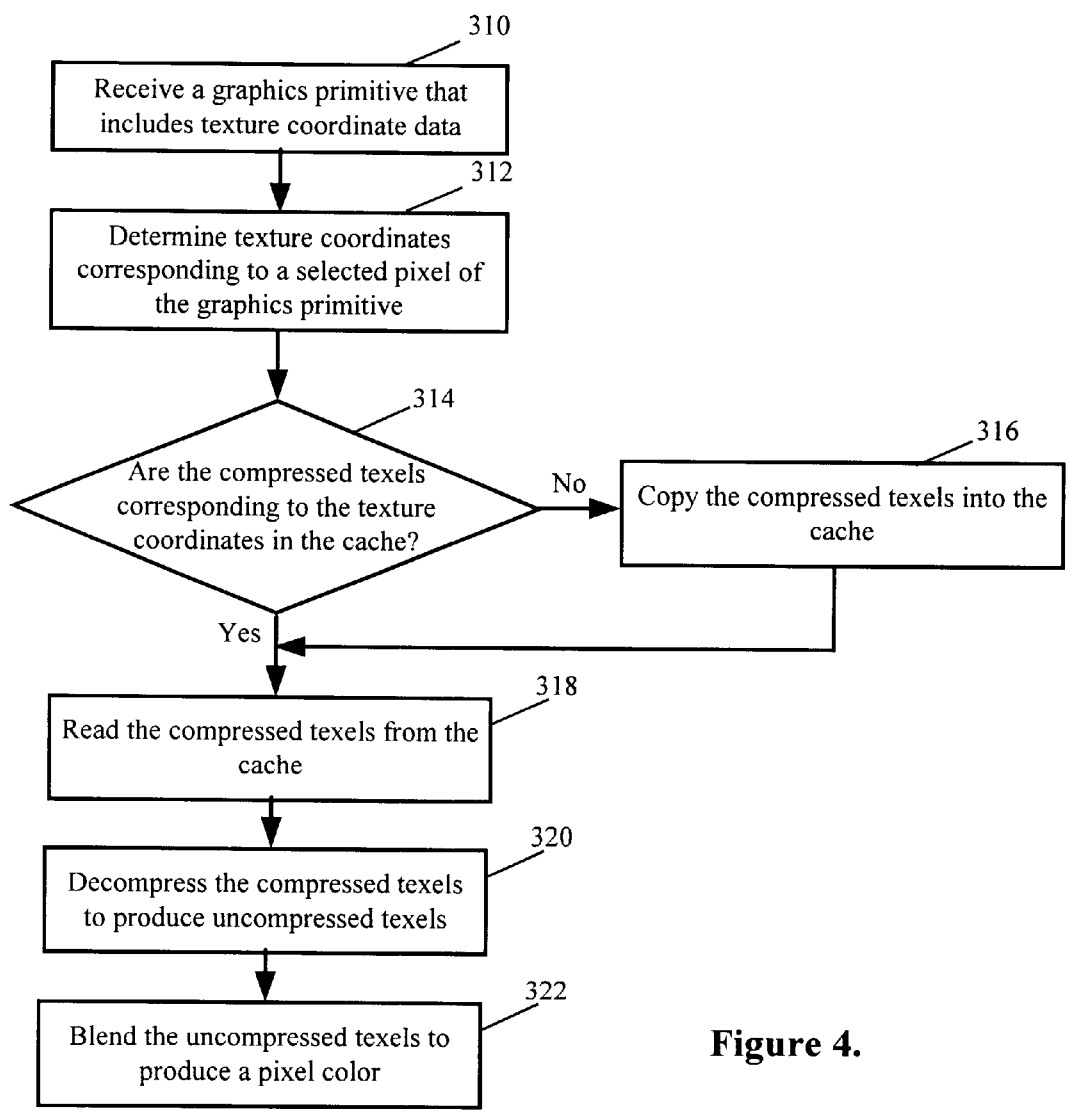
FIG. 4 illustrates a flow diagram of a method for texturing display primitives in accordance with the present invention.

FIG. 3 illustrates a texturing processor 300 that may be used to perform the method illustrated in FIG. 4. The texturing processor 300 includes a processing module 302 and memory 304. The processing module 302 may include a single processing entity or a plurality of processing entities. Such a processing entity may be a microprocessor, microcontroller, digital signal processor, state machine, logic circuitry, and/or any device that processes information based on operational and/or programming instructions. The memory 304 may be a single memory device or a plurality of memory devices. Such a memory device may be a read only memory device, random access memory device, floppy disk, hard drive memory, and/or any device that stores digital information. Note that when the processing module 302 has one or more of its functions performed by a state machine and/or logic circuitry, the memory containing the corresponding operational instructions is embedded within the state machine and/or logic circuitry.

The memory 304 stores programming and/or operational instructions that, when executed by the processing module 302, allow the processing module 302 to perform the method illustrated in FIG. 4. Note that the processor 300 may implement some of the functions of FIG. 4 through software stored in the memory 304, whereas other portions of the method may be implemented using hardware, or circuitry included within the processor 300. Thus, a mix of hardware and software may be used to perform the method illustrated in FIG. 4. It should also be noted that although the method of FIG. 4 may be performed through a mix of hardware and software, this is merely one embodiment of a system that can perform the method.

FIG. 4 illustrates a method for texturing display primitives in a video graphics system. The method begins at step 310 where a graphics primitive is received. The graphics primitive includes texture coordinate data corresponding to a first texture. Preferably, the texture coordinate data indicates a particular and texture coordinates corresponding to the vertices of the graphics primitive. The texture coordinate data provides a means to map points or pixel within the primitive in XY space to the texture in UV space.

At step 312, texture coordinates corresponding to a selected pixel in the graphics primitive are determined. Preferably, this determination is based on the texture coordinate data received with the graphics primitive and is accomplished using interpolation. The selected pixel is one pixel included in the graphics primitive, and the steps beginning with step 312 may be repeated for each of the pixels within the graphics primitive.

At step 314 it is determined whether or not the texels corresponding to the texture coordinates determined at step 312 are present in a cache. As described with respect to FIGS. 1 and 2, the texture data stored in the cache is stored in a compressed format such that the effective texture storing capability of the cache is increased. If it is determined at step 314 that the compressed texels corresponding to the texture coordinates are not present in the cache, the method proceeds to step 316. At step 316, the compressed texels corresponding to the texture coordinates are copied from a memory into the cache. Note that the texels are also stored in the memory in compressed format, thus reducing the memory bandwidth required to fetch these texels for storage in the cache.

Once the appropriate compressed texels are stored in the cache, the method proceeds to step 318 where the compressed texels are read from the cache. These compressed texels are then decompressed at step 320 to produce uncompressed texels. Preferably, the compression algorithm used to store the compressed texels in the memory and the cache is such that each of the texels is capable of being uncompressed independently of other texels. As such, multiple texels can be uncompressed in parallel. This allows for the color of a single pixel to be determined using a plurality of texels that are decompressed in parallel and then filtered to produce the eventual pixel color.

The blending, or filtering operation is performed at step 322. At step 322, the uncompressed texels are blended to produce a pixel color for the pixel. The blending operation at step 322 may include blending the uncompressed texels with additional color data to produce the pixel color for the selected pixel. As stated earlier, the additional color data may be constant color data, interpolated color data, or other texture color data corresponding to one or more additional textures that are also mapped to the selected pixel. In other cases, the blending operation performed at step 322 may include blending the uncompressed texels with additional color data that has been retrieved from a memory that stores a current set of color information for the selected pixel. In one example, current color information is retrieved from a frame buffer and blended with the uncompressed texels to determine an updated color value for the pixel that is then stored back in the frame buffer.

Step 322 may also include filtering the uncompressed texels prior to blending the uncompressed texels with the additional color data. Thus, if a filtering operation is to be performed on a number of texels that surround the coordinates of the selected pixel in the texture map, the filtering operation may be performed to determine a filtered color value that is then blended with the additional color data.

The method illustrated in FIG. 4 may be modified such that the decompression and blending of compressed texels for a plurality of pixels within the graphics primitive is performed in parallel. This may be facilitated by including a plurality of caches or a plurality of decompression blocks in the system performing the method illustrated. In other embodiments, the parallelism may be achieved by utilizing cache structures or other circuit components that include a number of access ports that allow data to be handled in a parallel fashion.

The method and apparatus described herein allow texturing operations to be performed in video graphics systems using compressed texture data such that memory bandwidth usage is reduced. Additional memory bandwidth savings is achieved by utilizing a cache structure within the circuitry that performs the texturing operations. By storing the texture data within the cache in a compressed format and only decompressing it when it is needed for use, the effective storage space of the cache in terms of texture storage is increased. In embodiments where a 4:1 compression ratio is achieved for the texture information, a cache that stores compressed texture information is capable of storing four times as much texture information as one that stores the texture information in an uncompressed format. This minimization of the memory bandwidth required to perform texturing operations enables video graphics circuits to perform complex texturing operations while maintaining overall system performance.

It should be understood that the implementation of other variations and modifications of the invention in its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A video graphics texture mapping circuit, comprising:
   memory storing compressed texture information corresponding to at least one texture;
   a cache operably coupled to the memory, wherein the cache stores a portion of the compressed texture information;
   a texture address module operably coupled to the memory and the cache, wherein the texture address module determines whether texture data for a texturing operation is stored in the cache, wherein when the texture data is not stored in the cache, the texture address module copies the texture data from the memory to the cache, wherein the texture address module provides control information to the cache such that the cache outputs the texture data; and
   a decompression block operably coupled to the cache, wherein the decompression block decompresses the texture data to produce uncompressed texture data for use in the texturing operation.

2. The circuit of claim 1 further comprises a filtering block operably coupled to the decompression block, wherein the filtering block combines the uncompressed texture data to produce a texture color.

3. The circuit of claim 2 further comprises a blending block operably coupled to the filtering block, wherein the blending block combines the texture color with additional color values to produce a blended color.

4. The circuit of claim 3 further comprises:
   a frame buffer that stores pixel colors for a plurality of pixels; and
   a source/destination blending block operably coupled to the blending block and the frame buffer, wherein the s/d blending block blends the blended color with a stored color for a corresponding pixel that is stored in a corresponding pixel location in the frame buffer to produce a resultant pixel color that is then stored in the corresponding pixel location of the frame buffer.

5. The circuit of claim 2, wherein the decompression block further comprises a plurality of texel decompression blocks, wherein each of the plurality of texel decompression blocks decompresses information corresponding to at least one texel for each filtering operation.

6. The circuit of claim 5 wherein each texel decompression block decompresses one texel for each filtering operation.

7. The circuit of claim 1, wherein the compressed texture information is compressed such that compression of each texel is independent of other texel values in the compressed texture information.

8. The circuit of claim 1, wherein the cache, the texture address module, and the decompression block are included in an integrated circuit.

9. The circuit of claim 8, wherein the integrated circuit is a video graphics integrated circuit that performs three-dimensional video graphics processing.

10. A video graphics texture mapping circuit comprising:
    memory storing compressed texture information corresponding to at least one texture;
    a plurality of caches operably coupled to the memory, wherein each of the plurality of caches stores a portion of the compressed texture information;
    a texture address module operably coupled to the memory and the plurality of caches, wherein the texture address module determines whether texture data for at least one texturing operation is stored in the plurality of caches such that the texture data is available for the at least one texturing operation, wherein when the texture data is not stored in the plurality of caches such that the texture data is available for the at least one texturing operation, the texture address module copies needed portions of the texture data from the memory to at least one of the plurality of caches, wherein the texture address module provides control information to the plurality of caches such that the texture data for the texturing operations is provided at outputs of the plurality of caches; and
    a plurality of decompression blocks operably coupled to the plurality of caches, wherein the plurality of decompression blocks decompress the texture data provided at the outputs of the plurality of caches to produce uncompressed texture data for the at least one texturing operation.

11. The circuit of claim 10 further comprises a filtering block operably coupled to the plurality of decompression blocks, wherein the filtering block combines the uncompressed texture data to produce a texture color.

12. The circuit of claim 11 further comprises a blending block operably coupled to the filtering block, wherein the blending block combines the texture color with additional color values to produce a blended color.

13. The circuit of claim 12 further comprises:
a frame buffer that stores pixel colors for a plurality of pixels; and
a source/destination blending block operably coupled to the blending block and the frame buffer, wherein the source/destination blending block blends the blended color with a stored color for a corresponding pixel that is stored in a corresponding pixel location in the frame buffer to produce a resultant pixel color that is then stored in the corresponding pixel location of the frame buffer.

14. The circuit of claim 12, wherein the filtering block further comprises a plurality of filtering blocks that produce a plurality of texture colors from the uncompressed texture data, wherein the blending block blends colors of the plurality of texture colors to produce the blended color.

15. The circuit of claim 10, wherein the compressed texture information is compressed such that compression of each texel is independent of other texel values in the compressed texture information.

16. The circuit of claim 10, wherein the plurality of caches, the texture address module, and the plurality of decompression blocks are included in an integrated circuit.

17. The circuit of claim 16, wherein the integrated circuit is a video graphics integrated circuit that performs three-dimensional video graphics processing.

18. A method for texturing display primitives, comprising:
receiving a graphics primitive for display, wherein the graphics primitive includes texture coordinate data corresponding to a first texture;
determining texture coordinates corresponding to a selected pixel in the graphics primitive;
when compressed texels corresponding to the texture coordinates are not present in a cache, copying the compressed texels from a memory into the cache;
reading the compressed texels from the cache;
decompressing the compressed texels to produce uncompressed texels; and
blending the uncompressed texels to produce a pixel color for the pixel.

19. The method of claim 18, wherein blending further comprises blending the uncompressed texels with additional color data to produce the pixel color for the selected pixel.

20. The method of claim 19, wherein the additional color data is retrieved from a memory storing current pixel color information.

21. The method of claim 19, wherein the additional color data is generated based on a second texture that is mapped to the selected pixel.

22. The method of claim 19, wherein blending includes filtering the uncompressed texels prior to blending with the additional color data.

23. The method of claim 18, wherein decompressing the compressed texels further comprises decompressing the compressed texels through independent decompression operations such that multiple compressed texels are uncompressed in parallel.

24. The method of claim 18, wherein multiple compressed texels that map to multiple pixels are read from the cache and uncompressed in parallel.

25. A texturing processor, comprising:
a processing module; and
memory operably coupled to the processing module, wherein the memory stores operating instructions that, when executed by the processing module, cause the processing module to perform the functions of:
determining texture coordinates corresponding to a selected pixel in a received graphics primitive, wherein the received graphics primitive includes texture coordinate data corresponding to a first texture;
when compressed texels corresponding to the texture coordinates are not present in a cache, copying the compressed texels from a memory into the cache;
reading the compressed texels from the cache;
decompressing the compressed texels to produce uncompressed texels; and
blending the uncompressed texels to produce a pixel color for the pixel.

26. The texturing processor of claim 25, wherein the memory further comprises instructions such that the processing module blends the uncompressed texels with additional color data to produce the pixel color for the selected pixel.

27. The texturing processor of claim 26, wherein the additional color data is retrieved from a memory storing current pixel color information.

28. The texturing processor of claim 26, wherein the additional color data is generated based on a second texture that is mapped to the selected pixel.

29. The texturing processor of claim 26, wherein the memory further comprises instruction such that the processing module filters the uncompressed texels prior to blending with the additional color data.

30. The texturing processor of claim 25, wherein the memory further comprises instruction such that the processing module decompresses the compressed texels compressed texels independently such that multiple compressed texels are uncompressed in parallel.

* * * * *